United States Patent Office 2,758,135
Patented Aug. 7, 1956

2,758,135

STABILIZING AMIDO DERIVATIVES OF ACRYLIC ACIDS

Mary L. Miller, New York, N. Y., assignor to American Cyanamid Company, New York, N. Y., a corporation of Maine No Drawing. Application May 23, 1952,
Serial No. 289,667

4 Claims. (Cl. 260—561)

The present invention relates to solutions of amido derivatives of an acrylic acid stabilized or inhibited with a nitrite salt of a strong base.

Acrylamide, methylol acrylamide and other acrylamido compounds have a variety of uses in the preparation of adhesives, dispersing agents, thickening agents, surface coatings, synthetic leather and rubber, and finishing agents for paper and textiles. In general, these materials are most conveniently employed in the form of aqueous solutions. However, such acrylamide compounds are subject to polymerization in such solutions on extended storage at room temperature and to more rapid polymerization at elevated temperatures. Accordingly, there is a demand for aqueous solutions of acrylamide compounds which are stabilized or inhibited against polymerization. Desirably the inhibiting agent is only present in such minor amounts that it may be left in the solution without substantially altering the properties of the eventual polymer. However, it is also desirable to have an inhibitor which may be removed without undue difficulty from the solution in instances where a pure polymer is desired.

It can not be predictetd a priori that substances like para t-butyl catechol and hydroquinone, which are widely used as inhibitors in nonaqueous solutions and monomers, will act as inhibitors in aqueous systems. This is not wholly a result of the lack of contact of monomer and inhibitor but results from the entirely different mechanism of catalyses which may be effective in this high dielectric medium.

Hydroquinone when added to air-saturated ethyl acrylate is a highly effective inhibitor for storage at 50° C. Monomer containing 0.10 hydroquinone remains unpolymerized for over 55 days at 50° C. but without the hydroquinone it polymerizes in 1 or 2 days. On the other hand, a system containing 250 cc. of ethyl acrylate, 50 mg. of sodium lauryl sulfate as an emulsifier and 25 mg. of potassium persulfate maintained at 50° C. shows no sign of polymerization in 45 minutes; whereas polymerization of this mixture, as evidenced by the formation of a cloudy white suspension, starts within 2 minutes upon the addition of 50 mg. of hydroquinone.

An object of the invention is to provide an inhibited solution of an acrylamide compound.

Another object of the invention is to provide a stable aqueous solution of a water-soluble monomeric amido derivative of an acrylic acid which may be readily polymerized.

Various other objects and advantages of the present invention will become apparent to those skilled in the art from the accompanying description and discussion.

The present invention concerns stable solutions of water-soluble monomeric amido derivatives of acrylic acids containing a nitrite salt of a strong base.

It has been discovered that nitrite salts of strong bases are inhibitors which prevent the polymerization of acrylamido compounds. While sodium and potassium nitrites are preferred since they are less dangerous in the dry state, it is contemplated that subtantially equivalent results are obtainable with ammonium nitrite. Although these inhibitors apparently cannot prevent the polymerization indefinitely of all concentrations of aqueous solutions of amido derivatives of acrylic acids at all temperatures, they nevertheless are highly effective inhibitors from a practical standpoint. This permits the convenient handling of such compounds as solutions which may be stored, evaporated or otherwise concentrated without polymerizing at atmospheric and elevated temperatures. Particularly striking inhibiting effects have been obtained with acrylamide and methylol acrylamide. A stabilized solution may be polymerized with the usual amount of polymerization catalyst; that is, no undue excess of polymerization catalyst is required to counteract the effect of the inhibiting agent. Thus the alkali nitrite has a strong inhibiting effect on the autopolymerization of solutions of acrylamide compounds without rendering difficult subsequent polymerization in the presence of catalysts. On the other hand, when the removal of the inhibitor is desired before polymerizing or otherwise using the acrylamide derivative it is recommended that the alkali nitrite be removed by recrystallizing the acrylamide monomer or by treatment of aqueous solutions with ion-exchange resins.

The stabilizing influence of the nitrite salts of strong bases extends to aqueous solutions of all polymerizable water-soluble monomeric amido derivatives of an acrylic acid. This group includes acrylamide and substituted acrylamides as exemplified by methacrylamide, methylol acrylamide, methylol methacrylamide, N,N'-dimethylacrylamide and other derivatives of acrylamide and methacrylamide with lower alkyl and alkylol substituents. Such materials may be denoted by polymerizable, water-soluble monomers having the following structural formula:

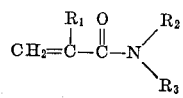

where $R_1$ stands for an H, $CH_3$ or $C_2H_5$ radical, and $R_2$ and $R_3$ each represent an H, $CH_3$, $C_2H_5$—$CH_2OH$ or —$C_2H_4OH$ group.

The quantity of inhibiting nitrite salt may vary between about 0.001 and about 2.0% or more based on the weight of monomeric acrylamide compound; but the recommended range is between about 0.01 and 0.5%. There is even a possibility that excessive quantities of the nitrite may be less effective in stabilizing the monomer than the stated quantities, but at any rate large amounts of the inhibitor are undesirable because of their cost as well as the additional effort required in certain instances in separating them from the acrylic derivative.

For polymerizing the acrylamide compound, oxygen-containing vinyl polymerization catalysts which are at least somewhat water-soluble are definitely preferred. Among the many suitable catalysts are urea-peroxide, diacetyl peroxide, peracetic acid, and the ammonium, sodium and potassium salts of persulfuric acid, perboric acid and percarbonic acid. Excellent results are obtainable with redox catalyst systems such as the chloric acid-bisulfite system set forth in the copending application of Arthur Cresswell, Serial No. 208,979, filed February 1, 1951.

It is also contemplated that the various catalyst promoters and modifiers previously used in catalytic polymerizations may also be employed in the present invention. Since it does not appear necessary to add extra quantities of the catalyst in order to overcome the effect of the inhibitor in the solution, conventional amounts of the polymerization catalyst are recommended, for example, between 0.1 and 5.0% by weight of the catalyst based on the weight of the acrylamide compound may be used in general.

The present invention is best understood by reference to the following examples which illustrate the invention and should not be construed in a limited sense. All proportions are given in terms of weight unless otherwise stated.

*Example I*

A 55% aqueous methylol acrylamide solution is divided by pouring it into two glass bottles. Sodium nitrite in a quantity amounting to 0.1% based on the weight of the methylol acrylamide containing in one of the bottles is dissolved directly in one of the bottles with thorough stirring or shaking to form a stabilized sample. The second bottle which contains no additives is used as a control sample. The two bottles are stoppered and maintained in darkness at 50° C. in an oven for an extended period. Frequent inspections of the solutions are made during this period to detect any substantial increase in viscosity, since thickening indicates the formation of polymer. It is observed that the control sample polymerizes to a gel in four months whereas the stabilized sample containing sodium nitrite shows no visible thickening after nine months of storage at 50° C.

*Example II*

An aqueous solution of methylol acrylamide containing 55% solids by weight is divided equally between two glass flasks. In forming a stabilized solution, 0.2% sodium nitrite based on the weight of the methylol acrylamide in the flask is added with thorough mixing to the first flask while the untreated second solution serves as a control sample. Then the two flasks are stored in darkness in an oven maintained at 83° C. for a long period. It is observed that the control sample gels in 19 days whereas the inhibited sample displays no visible thickening or other indications of polymer formation after 60 days.

*Example III*

Upon repeating Example II with no change other than the substitution of the same weight of potassium nitrite in lieu of the sodium nitrite as the polymerization inhibitor substantially the same results are obtained.

*Example IV*

To 100 parts by weight of a 5% aqueous solution of acrylamide is added 0.01 part of sodium nitrite. 90 parts of the water in the solution is evaporated off by distilling at a maximum of 80° C. under the vacuum obtainable with a water aspirator. This concentrates the solution to 50% by weight of acrylamide. The nitrite salt is then removed by passing the concentrated solution through separate columns of cation exchange and anion exchange resins. Upon the addition of 0.01 part of ammonium persulfate, and heating to about 75 to 85° C. the concentrated solution polymerizes into a thick gel after a short induction period.

*Example V*

In this instance a 10% acrylamide solution is mixed with 0.1% by weight of sodium nitrite based on the acrylamide. To the clear solution, 0.2% potassium persulfate based on the weight of the acrylamide is added and the solution heated to 80° C. After an induction period of approximately 10 minutes a visible thickening is observed which denotes polymerization of the acrylamide. The quantity of polymerization catalyst employed here is substantially the same as would be employed in the absence of the stabilizer or inhibitor.

In the table below are tabulated the results observed in Examples VI to XI inclusive using aqueous solutions of acrylamide of varying concentrations of acrylamide inhibited with varying amounts of sodium nitrite listed as percentages of the dry weight of acrylamide. The stability of these liquids is determined by observing the number of days (hours in one instance) that elapsed before any thickening, or, in the case of solutions containing over 20% monomer, gelation is detected in the solutions which are maintained at the stated temperatures in the dark without agitation.

| Ex. | Acrylamide, Wt. Percent | NaNO₂, Wt. Percent based on Acrylamide | Stability | | |
|---|---|---|---|---|---|
| | | | Days at 50° C. | Days at 80° C. | Days at 100° C. |
| VI | 7.5 | 0.33 | over 61 | over 40 | over 40. |
| VII | 8.4 | 0.08 | ...do..... | ...do..... | Do. |
| VIII | 27.5 | 0.33 | ...do..... | ...do..... | 1 or 2. |
| IX | 32.5 | 0.27 | ...do..... | ...do..... | 1.16. |
| X | 48.0 | 0.20 | over 63 | 63 | 5. |
| XI | 82.0 | 0.21 | 12 | 1 or 2 | 1.5 hours. |

From the above experiments and other studies, it has been found that both uninhibited and stabilized aqueous solutions of amido derivates of an acrylic acid polymerize more readily as the temperature increases and also as the concentration of the acrylamide compound increases. However an alkali nitrite inhibitor is effective to substantially increase the stability of such solutions at all temperatures and concentrations of said derivatives.

Having described my invention, what I claim as new and desire to secure by Letters Patent, is:

1. A composition of matter which comprises an aqueous solution of a major proportion of a compound having the formula:

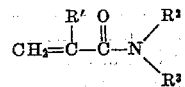

wherein R' is a radical of the group consisting of H, CH₃ and C₂H₅ radicals and R² and R³ each is a radical of the group consisting of H, CH₃, CH₂OH and C₂H₄OH radicals and a minor proportion of a nitrite of the group consisting of sodium nitrite and potassium nitrite sufficient to inhibit the addition polymerization of said compound.

2. A composition according to claim 1 in which the weight of said nitrite is between 0.001 and 2.0 per cent of the weight of said compound.

3. A composition of matter which comprises an aqueous solution of monomeric acrylamide inhibited against addition polymerization by between 0.01 and 0.5 per cent based on the weight of acrylamide of sodium nitrite.

4. A composition of matter which comprises an aqueous solution of monomeric methylol acrylamide inhibited against addition polymerization by between 0.01 and 0.5 per cent based on the weight of methylol acrylamide of sodium nitrite.

References Cited in the file of this patent

UNITED STATES PATENTS

| 2,320,533 | Muskat et al. | June 1, 1943 |
| 2,383,425 | Stewart | Aug. 21, 1945 |
| 2,491,444 | Cox et al. | Dec. 13, 1949 |
| 2,607,081 | Taylor | Aug. 19, 1952 |

OTHER REFERENCES

Ratchford: "Ind. and Eng. Chem.," vol. 42 (1950), p. 1567.

Chem. Abst., vol. 42 (1948), pp. 8510–11.